United States Patent
Liao et al.

(10) Patent No.: US 9,052,537 B1
(45) Date of Patent: Jun. 9, 2015

(54) 2D/3D IMAGE SWITCHING TYPE LIQUID CRYSTAL DISPLAY

(75) Inventors: Qiaosheng Liao, Shenzhen (CN); Chia-Chiang Hsiao, Shenzhen (CN); Chih-Wen Chen, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/703,355

(22) PCT Filed: Aug. 20, 2012

(86) PCT No.: PCT/CN2012/080340
§ 371 (c)(1),
(2), (4) Date: Dec. 11, 2012

(87) PCT Pub. No.: WO2014/023043
PCT Pub. Date: Feb. 13, 2014

(30) Foreign Application Priority Data

Aug. 9, 2012 (CN) .......................... 2012 1 0281697

(51) Int. Cl.
*G02F 1/13* (2006.01)
*G02B 27/22* (2006.01)

(52) U.S. Cl.
CPC .......... *G02F 1/1323* (2013.01); *G02B 27/2228* (2013.01)

(58) Field of Classification Search
CPC .................................................... G02F 1/1313
USPC ........................................................ 349/15
See application file for complete search history.

(56) References Cited

U.S. PATENT DOCUMENTS

| | | | | |
|---|---|---|---|---|
| 6,046,787 A * | 4/2000 | Nishiguchi | .................. | 349/129 |
| 6,084,647 A * | 7/2000 | Hatano et al. | .................. | 349/15 |
| 6,533,420 B1 * | 3/2003 | Eichenlaub | .................... | 353/7 |
| 6,714,174 B2 * | 3/2004 | Suyama et al. | ................ | 345/32 |
| 7,775,666 B2 * | 8/2010 | Kubara et al. | ...................... | 353/7 |
| 7,787,008 B2 * | 8/2010 | Fukushima et al. | ............ | 348/51 |
| 2005/0285997 A1 | 12/2005 | Koyama et al. | | |
| 2008/0259232 A1 * | 10/2008 | Kim et al. | ........................ | 349/15 |
| 2011/0043713 A1 * | 2/2011 | Nam et al. | ....................... | 349/15 |
| 2012/0002123 A1 * | 1/2012 | Kang | .............................. | 349/15 |
| 2012/0162763 A1 | 6/2012 | Son | | |
| 2012/0229719 A1 * | 9/2012 | Ishiguro | .......................... | 349/15 |
| 2013/0070197 A1 | 3/2013 | Chang | | |

FOREIGN PATENT DOCUMENTS

| | | |
|---|---|---|
| CN | 1685277 A | 10/2005 |
| CN | 202025132 U | 11/2011 |
| CN | 102314019 A | 1/2012 |
| CN | 102572473 A | 7/2012 |
| TW | 200949293 A | 12/2009 |

\* cited by examiner

*Primary Examiner* — James Dudek
(74) *Attorney, Agent, or Firm* — Mark M. Friedman

(57) ABSTRACT

A 2D/3D image switching type liquid crystal display is described. The 2D/3D image switching type liquid crystal display includes a liquid crystal display (LCD), a film-type patterned retarder (FPR) and a liquid crystal barrier layer. When either the FPR is disposed between the LCD panel and the liquid crystal barrier layer or liquid crystal barrier layer is disposed between the LCD panel and the backlight module, an electrical field controls the first grating regions and the second grating regions to form a bright region and a dark region for adjusting the left-hand circularly polarized light and the right-hand circularly polarized light from the FPR to switch 2D/3D image by switching the liquid crystal barrier layer.

18 Claims, 5 Drawing Sheets

2D/3D IMAGE SWITCHING TYPE LIQUID CRYSTAL DISPLAY

FIELD OF THE INVENTION

The present invention relates to an image display apparatus, and more particularly to two-dimensional and three-dimensional (2D/3D) image switching type liquid crystal display.

BACKGROUND OF THE INVENTION

The three-dimensional image display applies stereoscopic or autostereoscopic technique to display three-dimensional images. The stereoscopic technique implements the three-dimensional effect by the image parallax of the viewer's right and left eyes. The stereoscopic technique includes the methods with the polarized glasses and without the polarized glasses, which are widely employed. In the manner of taking polarized glasses, the image parallax of the viewer's right and left eyes can be displayed on the display apparatus based on direct sense of sight by changing the polarization direction of the image parallax of the viewer's right and left eyes. For example, a film-type patterned retarder (FPR) is applied to liquid crystal display (LCD) so that the viewer is capable of viewing the three-dimensional image using the polarized glasses. In the manner without polarized glasses, an optical plate with the separated image parallax of the viewer's right and left eyes in an optical axis is installed before or after the display apparatus for generating three-dimensional image.

Conventionally, when the viewer squarely observes the three-dimensional image on the LCD, the vertical viewing angle is decreased, which results from the image crosstalk. In other words, one eye of the viewer observes the image signal originally projected to the other eye of the viewer so that the image signal of the right eye is interfered with the other image signal of the left eye, which results in a narrowed visual field angle. Consequently, there is a need to develop a stereoscopic image display apparatus to solve the problem of image crosstalk while viewing the LCD in a slant manner.

SUMMARY OF THE INVENTION

One objective of the present invention is to provide a two-dimensional and three-dimensional (2D/3D) image switching type liquid crystal display for increasing the vertical viewing angle of the LCD to solve the problem of image crosstalk by using a liquid crystal barrier layer.

According to the above objective, the present invention sets forth a two-dimensional and three-dimensional (2D/3D) image switching type liquid crystal display. In a first embodiment of the present invention, the two-dimensional and three-dimensional (2D/3D) image switching type liquid crystal display includes: a liquid crystal display (LCD) panel, for being passed by a light beam along a first direction to form a left-eye image and a right-eye image; a film-type patterned retarder (FPR) disposed on one side of the LCD panel and comprising a plurality of first phase difference regions and a plurality of second phase difference regions mutually interlaced with the first phase difference regions, wherein the left-eye image and the right-eye image correspondingly pass through the first phase difference regions and the second phase difference regions for forming a left-hand circularly polarized light and a right-hand circularly polarized light by the FPR; and a liquid crystal barrier layer comprising a plurality of first grating regions and a plurality of second grating regions mutually interlaced with the first grating regions, the FPR being disposed between the liquid crystal barrier layer and the LCD panel, and the first grating regions and the second grating regions corresponding to the first phase difference regions and the second phase difference regions, wherein an electrical field controls the first grating regions and the second grating regions to form a bright region and a dark region for adjusting the left-hand circularly polarized light and the right-hand circularly polarized light from the FPR so that either a left eye and a right eye of a viewer can simultaneously observe one of the left-eye image and the right-eye image to form a two-dimensional image or the left eye and the right eye can correspondingly observe the left-eye image and the right-eye image respectively via the bright region to form a three-dimensional image by switching the liquid crystal barrier layer.

In a second embodiment of the present invention, the two-dimensional and three-dimensional (2D/3D) image switching type liquid crystal display includes: a backlight module, providing a backlight along a first direction; a liquid crystal barrier layer disposed on one side of the backlight module and comprising a plurality of first grating regions and a plurality of second grating regions mutually interlaced with the first grating regions; a liquid crystal display (LCD) panel disposed on one side of the liquid crystal barrier layer, wherein the liquid crystal barrier layer is disposed between the backlight module and the LCD panel and the backlight sequentially passes through the liquid crystal barrier layer and the LCD panel to form a left-eye image and a right-eye image; and a film-type patterned retarder (FPR) disposed on one side of the LCD panel and comprising a plurality of first phase difference regions and a plurality of second phase difference regions mutually interlaced with the first phase difference regions, wherein the first phase difference regions and the second phase difference regions correspond to the first grating regions and the second grating regions, and the left-eye image and the right-eye image correspondingly pass through the first phase difference regions and the second phase difference regions for forming a left-hand circularly polarized light and a right-hand circularly polarized light by the film-type patterned retarder; wherein an electrical field controls the first grating regions and the second grating regions to form a bright region and a dark region for adjusting the left-hand circularly polarized light and the right-hand circularly polarized light from the FPR so that either a left eye and a right eye of a viewer can simultaneously observe one of the left-eye image and the right-eye image to form a two-dimensional image or the left eye and the right eye can correspondingly observe the left-eye image and the right-eye image respectively via the bright region to form a three-dimensional image by switching the liquid crystal barrier layer.

In one embodiment, when the electrical field is not applied to the liquid crystal barrier layer, the first grating regions and the second grating regions are bright regions so that the left eye and the right eye of the viewer can simultaneously observe one of the left-eye image and the right-eye image to form the two-dimensional image.

In one embodiment, when the electrical field is applied to the liquid crystal barrier layer, the first grating regions are dark regions and the second grating regions are bright regions to allow the second grating regions to adjust the left-hand circularly polarized light and the right-hand circularly polarized light so that the left eye and the right eye can correspondingly observe the left-eye image and the right-eye image respectively by a polarized glasses to form a three-dimensional image by switching the liquid crystal barrier layer.

In one embodiment, the LCD panel further comprises a color filter disposed on one side of the FPR and opposite to the liquid crystal barrier layer, the color filter comprises a plurality of color regions and a plurality of black matrixes along a second direction perpendicular to the first direction, the color regions are mutually interlaced with the black matrixes, and the widths of the first grating regions are greater than these of the black matrixes respectively along the second direction.

In one embodiment, when the electrical field is applied to the liquid crystal barrier layer, the first grating regions are dark regions and the second grating regions are bright regions to allow the second grating regions to adjust the left-hand circularly polarized light and the right-hand circularly polarized light so that the left eye and the right eye can correspondingly observe the left-eye image and the right-eye image respectively without glasses to form a three-dimensional image by switching the liquid crystal barrier layer.

In one embodiment, the first grating regions and the second grating regions are mutually interlaced along a second direction perpendicular to the first direction.

In one embodiment, a polarized plate is disposed between the LCD panel and the FPR for receiving the left-eye image and the right-eye image to form a polarized light to pass through the FPR for generating the left-hand circularly polarized light and the right-hand circularly polarized light.

In one embodiment, each of the first grating regions along the first direction correspondingly aligns to a boundary between each of the first phase difference regions and each of the second phase difference regions, and each of the second grating regions along the first direction correspondingly aligns to each of the first phase difference regions and each of the second phase difference regions.

In one embodiment, each of the first phase difference regions and each of the second phase difference regions comprises a $\lambda/4$ retarder region and a $-\lambda/4$ retarder region.

The present invention provides a two-dimensional and three-dimensional (2D/3D) image switching type liquid crystal display for increasing the vertical viewing angle of the LCD to solve the problem of image crosstalk and switch 2D/3D image by switching the liquid crystal barrier layer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
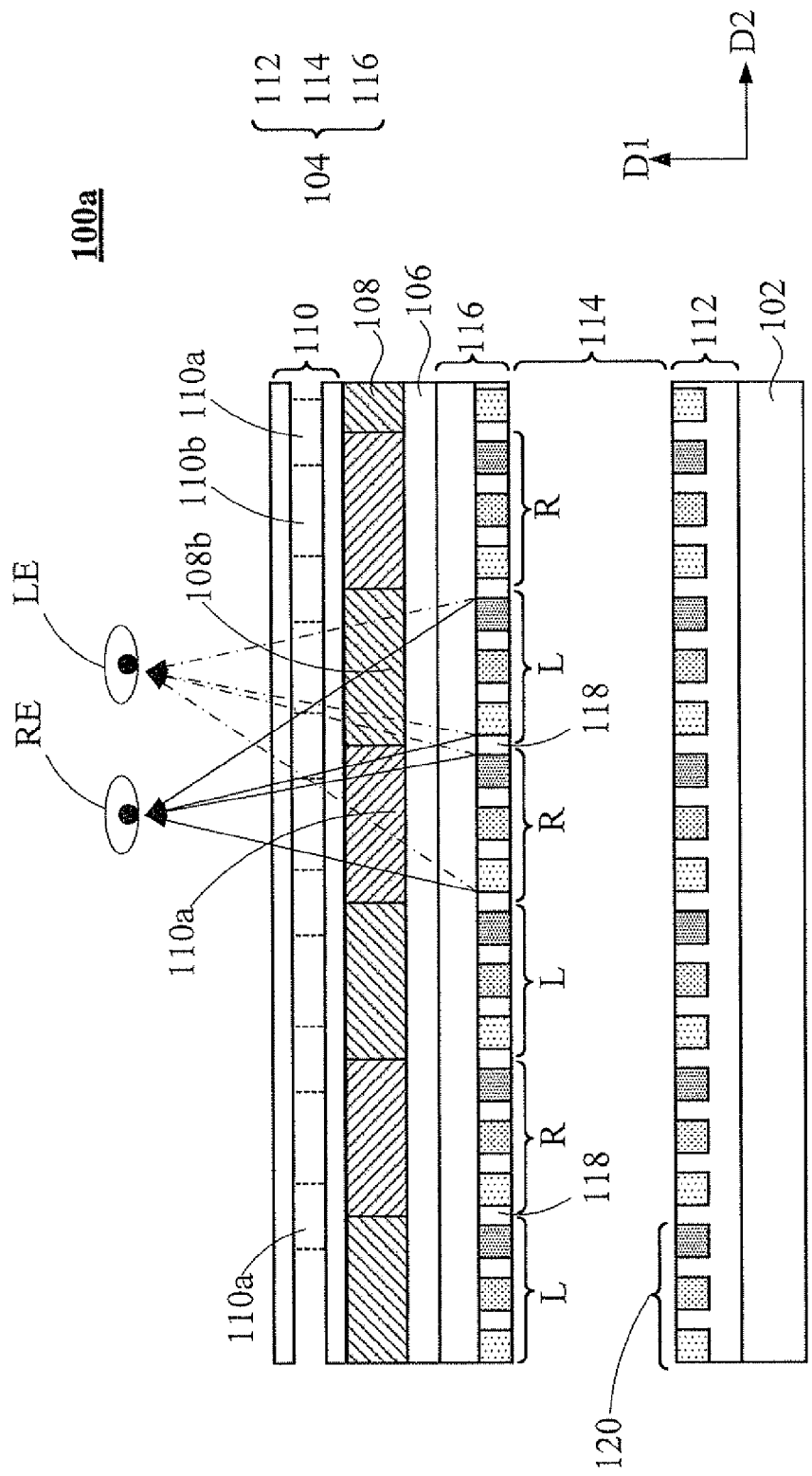
FIG. 1 is a schematic cross-sectional view of a 2D/3D image switching type liquid crystal display in a two-dimensional image displaying status according to a first embodiment of the present invention.
Figure 2:
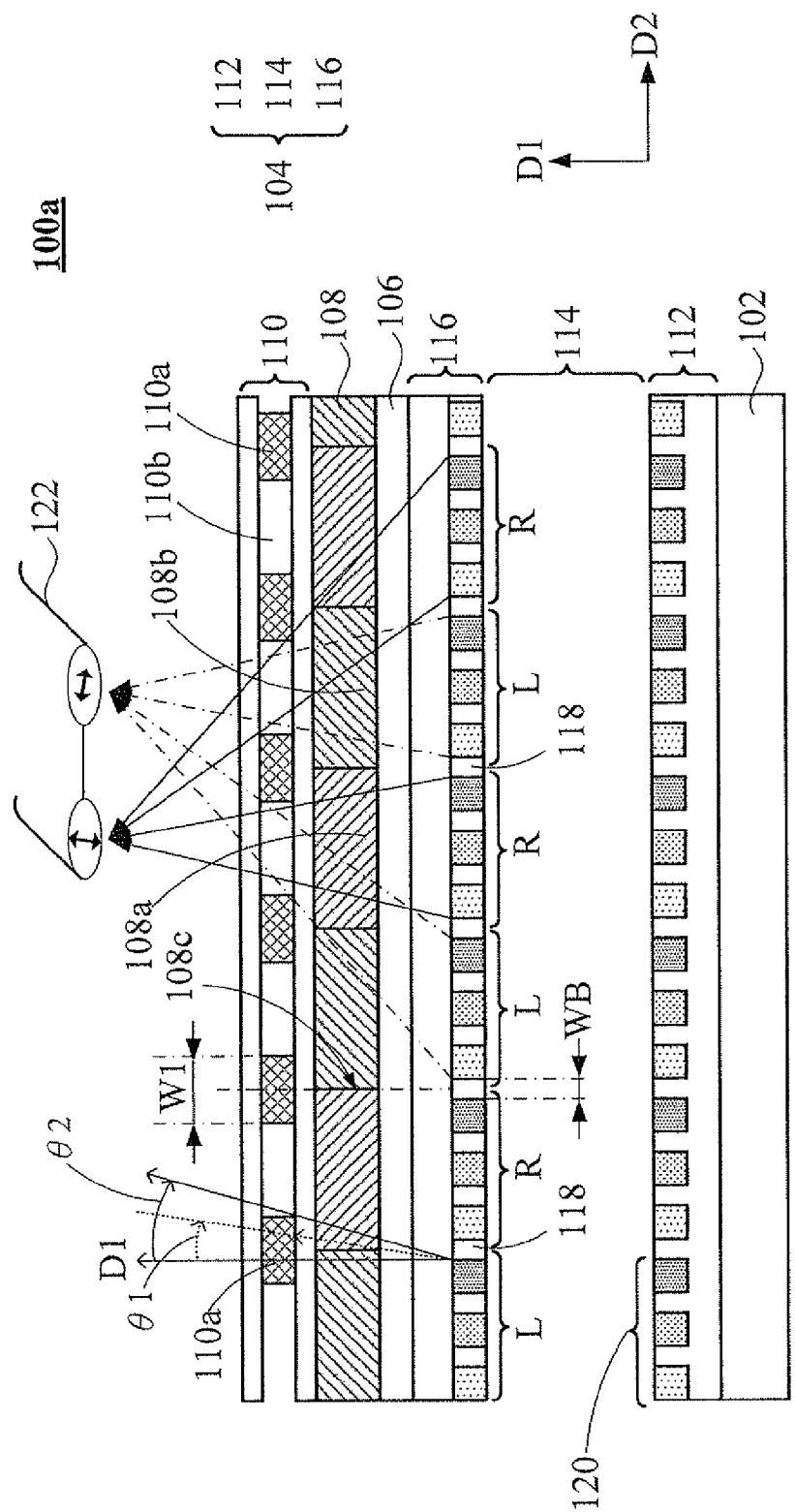
FIG. 2 is a schematic cross-sectional view of a 2D/3D image switching type liquid crystal display in a three-dimensional image displaying status by adopting polarized glasses according to a first embodiment of the present invention.
Figure 3:
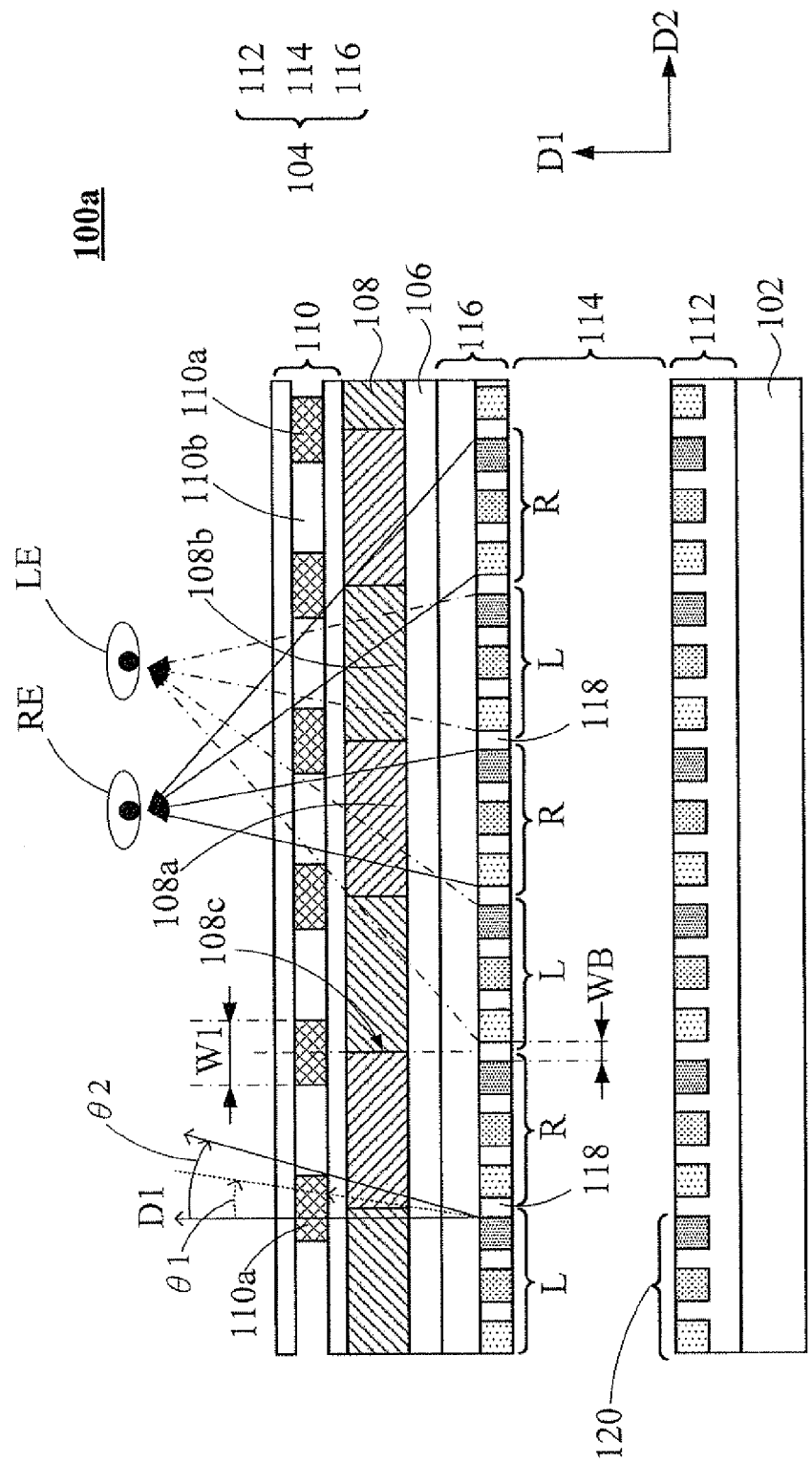
FIG. 3 is a schematic cross-sectional view of a 2D/3D image switching type liquid crystal display in a three-dimensional image displaying status without glasses according to a first embodiment of the present invention.

Please refer to FIG. 1, FIG. 2 and FIG. 3. FIG. 1 is a schematic cross-sectional view of a two-dimensional and three-dimensional (2D/3D) image switching type liquid crystal display in a two-dimensional image displaying status 100a according to a first embodiment of the present invention. FIG. 2 is a schematic cross-sectional view of a 2D/3D image switching type liquid crystal display 100a in a three-dimensional image displaying status by adopting polarized glasses according to a first embodiment of the present invention. FIG. 3 is a schematic cross-sectional view of a 2D/3D image switching type liquid crystal display 100a in a three-dimensional image displaying status without the glasses according to a first embodiment of the present invention.

The 2D/3D image switching type liquid crystal display 100a includes a backlight module 102, a liquid crystal display (LCD) panel 104, a polarized plate 106, film-type patterned retarder (FPR) 108 and liquid crystal barrier layer 110. The backlight module 102 provides a backlight to pass through the LCD panel 104 along a first direction "D1" to form a left-eye image L and a right-eye image R. In one embodiment, the backlight module 102 may be a light source selected from one of the cold cathode fluorescent lamp (CCFL) and light-emitted diode (LED).

The LCD panel 104 includes a thin-film transistor (TFT) array substrate 112, a liquid crystal 114 and a color filter 116. The liquid crystal 114 is disposed between the TFT array substrate 112 and the color filter 116. The color filter 116 may be filter array plate having red, green and blue color portions. In one embodiment, the liquid crystal barrier layer 110 is disposed on one side of the FPR 108 and the color filter 116 is disposed on the other side of the FPR 108. The color filter 116 includes a plurality of color regions (corresponding to the left-eye image L and the right-eye image R of pixel unit 120) and a plurality of black matrixes 118 along a second direction "D2" perpendicular to the first direction, the color regions 120 are mutually interlaced with the black matrixes 118.

In one embodiment, a polarized plate 106 is disposed between the LCD panel 104 and the FPR 108 for receiving the left-eye image L and the right-eye image R to form a polarized light, e.g. vertical polarized light, to pass through the FPR 108 for generating the left-hand circularly polarized light and the right-hand circularly polarized light. The polarized plate 106 is used to polarize the light beam. When the backlight from the backlight module 102 passes through the polarized plate 106, the backlight is then polarized. The TFT on the TFT array substrate 112 can control the twisted status of the liquid crystal layer 114 for changing the polarized angle of the light beam. In another case, the polarized plate 106 is disposed between the backlight module 102 and the LCD panel 104.

The film-type patterned retarder (FPR) 108 is disposed on one side of the LCD panel 104 and includes a plurality of first phase difference regions 108a and a plurality of second phase difference regions 108b mutually interlaced with the first phase difference regions 108a along the second direction "D2" perpendicular to the first direction "D1". Each of the first phase difference regions and each of the second phase difference regions of the FPR 108 includes a 214 retarder region and a $-\lambda/4$ retarder region. In other words, a $\lambda/4$ retarder region is in a previous row, a $-\lambda/4$ retarder region is in a current row, a $\lambda/4$ retarder region is in a next row, and the rest may be inferred by analogy.

The liquid crystal barrier layer 110 is disposed on one side of the FPR 108 and the FPR 108 is disposed between the liquid crystal barrier layer 110 and the LCD panel 104. The liquid crystal barrier layer 110 includes a plurality of first grating regions 110a and a plurality of second grating regions 110b mutually interlaced with the first grating regions 110a. The first grating regions 110a and the second grating regions 110b correspond to the first phase difference regions 108a and the second phase difference regions 108b. The liquid crystal barrier layer 110 serves as the function of raster. Each of the first grating regions 110a along the first direction "D1" correspondingly aligns to a boundary 108c between each of the first phase difference regions 108a and each of the second phase difference regions 108b. Each of the second grating regions 110b along the first direction "D1" correspondingly aligns to each of the first phase difference regions 108a and each of the second phase difference regions 108b.

The exertion of an electrical field is capable of controlling the first grating regions and the second grating regions of the liquid crystal barrier layer 110 to form a bright region and a dark region for adjusting the left-hand circularly polarized light and the right-hand circularly polarized light from the FPR 108 to switch the 2D/3D displaying status. In other words, a left eye and a right eye of a viewer can simultaneously observe one of the left-eye image L and the right-eye image R to form a two-dimensional image. Alternatively, the left eye and the right eye can correspondingly observe the left-eye image L and the right-eye image R respectively via the bright region to form a three-dimensional image by switching the liquid crystal barrier layer. In one case, the first grating regions 110a and the second grating regions 110b are mutually interlaced along a second direction "D2" perpendicular to the first direction "D1".

In one case of FIG. 1, when the electrical field is not applied to the liquid crystal barrier layer 110, the liquid crystal barrier layer 110 is in a normally white mode and the FPR 108 cannot affect the displaying status of the left-eye image L and the right-eye image R. Meanwhile, the first grating regions 110a and the second grating regions 110b are bright regions so that the left eye "LE" and the right eye "RE" of the viewer can simultaneously observe the left-eye image L and the right-eye image R to form the two-dimensional image.

In one case of FIG. 2, while performing a polarized three-dimensional image, the left-eye image L and the right-eye image R correspondingly pass through the first phase difference regions 108a and the second phase difference regions 108b for forming a left-hand circularly polarized light and a right-hand circularly polarized light by the FPR 108. In other words, when the light beam with different polarized directions projects on the filter array plate with red, green and blue color portions of the color filter 116 and then enters the FPR 108, the light beam passing through the FPR 108 includes two kind of different polarized directions. When the electrical field (e.g. generated by voltage signal) is applied to the liquid crystal barrier layer 110 by a driver (not shown) for changing the twisted status of liquid crystal molecules, the first grating regions 110a are dark regions and the second grating regions 110b are bright regions to allow the second grating regions 110b to adjust the left-hand circularly polarized light and the right-hand circularly polarized light so that the left eye and the right eye can correspondingly observe the left-eye image and the right-eye image respectively by a polarized glasses 122 to form a three-dimensional image by switching the liquid crystal barrier layer 110.

Based on proper design, the image projected on the left eye "LE" of the viewer has a first polarized direction and the image projected on the right eye "RE" of the viewer has a second polarized direction. The left-hand lens of the polarized glasses 122 only allows the left-eye image L with first polarized direction to be passed and the right-hand lens of the polarized glasses 122 only allows the right-eye image R with second polarized direction. Thus, when the viewer wears the polarized glasses 122, the left eye is provided with the image for the left eye and the right eye is provided with the image for the right eye so that the viewer can see the three-dimensional image by the parallax theorem. As shown in FIG. 2, the polarized glasses 122 is composed of the left-hand polarized lens (not shown) and the right-hand polarized lens (not shown) having polarized films thereon.

Please continuously refer to FIG. 2. The widths "W1" of the first grating regions 110a of the liquid crystal barrier layer 110 are greater than the widths "WB" of the black matrixes 118 respectively along the second direction "D2". In another case, the widths "W1" is equal to or less than the widths "WB". Conventionally, when the left-eye image L from the TFT array substrate 112 pass the black matrixes 118 of the color filter 116 to emit a light beam in a narrower first viewing angle, the emitted light beam is blocked by the first grating regions 110a. However, the 2D/3D image switching type liquid crystal display of the present invention emits the light beam in a wider second viewing angle so that the image seen by the left eye is not overlapped with the image seen by the right eye to effectively increasing the vertical viewing angle.

In one case of FIG. 3, while performing a three-dimensional image without glasses and when the electrical field is applied to the liquid crystal barrier layer 110, the first grating regions 110a are dark regions and the second grating regions 110b are bright regions to allow the second grating regions 110b to adjust the left-hand circularly polarized light and the right-hand circularly polarized light so that the left eye "LE" and the right eye "RE" can correspondingly observe the left-eye image L and the right-eye image R respectively without glasses to form a three-dimensional image by switching the liquid crystal barrier layer 110.

Figure 4:
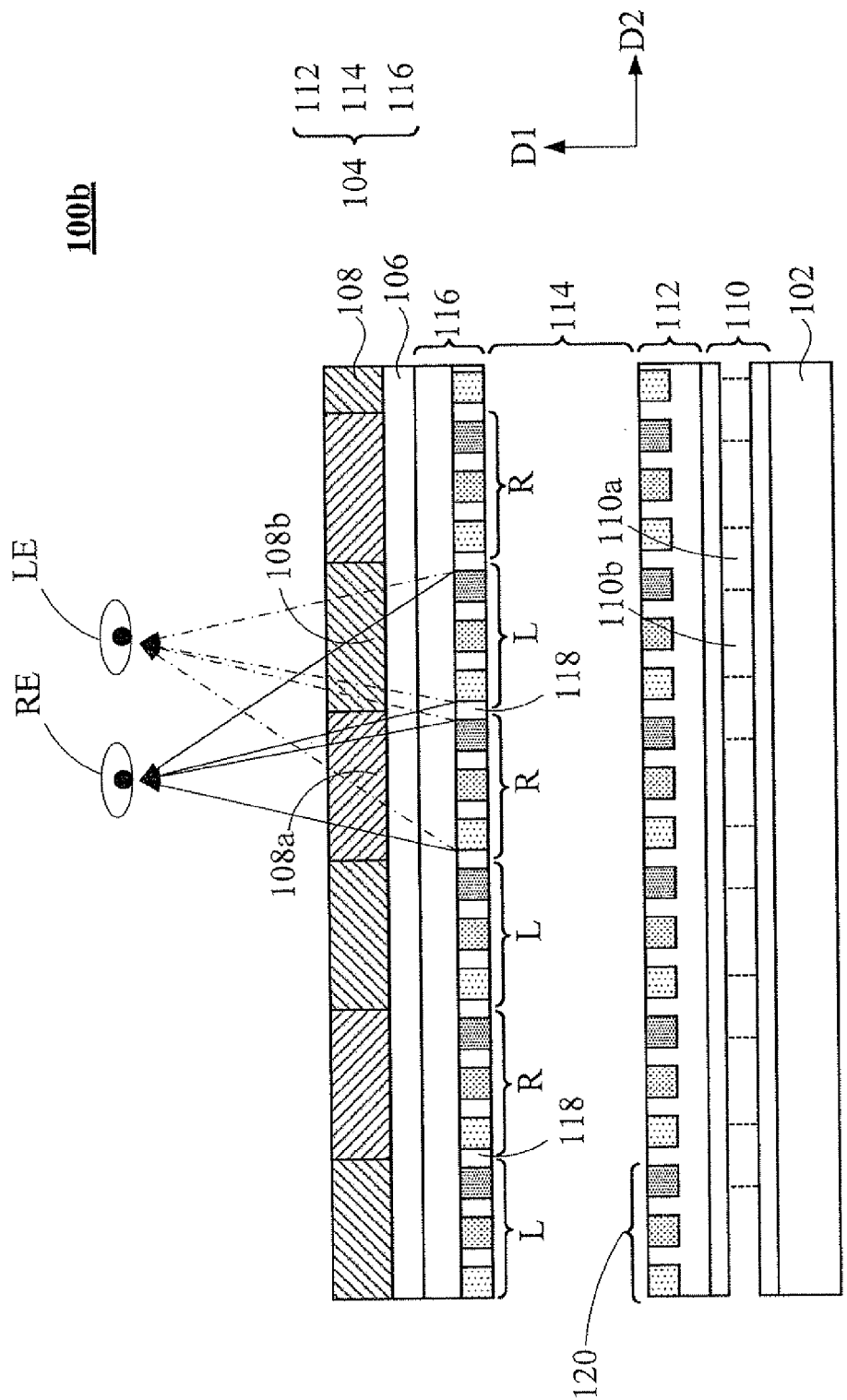
FIG. 4 is a schematic cross-sectional view of a 2D/3D image switching type liquid crystal display in a two-dimensional image displaying status according to a second embodiment of the present invention.
Figure 5:
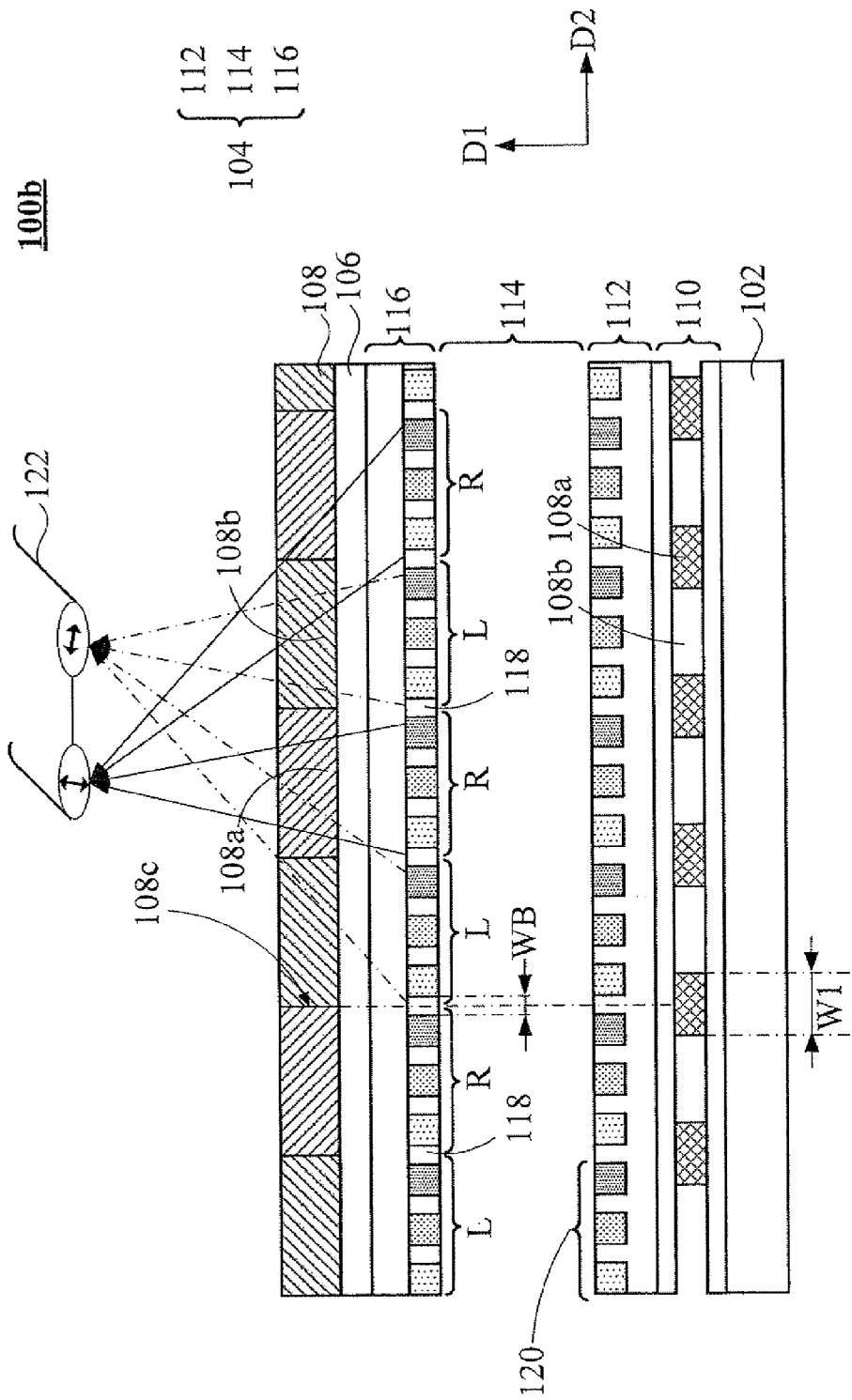
FIG. 5 is a schematic cross-sectional view of a 2D/3D image switching type liquid crystal display in a three-dimensional image displaying status by adopting polarized glasses according to a second embodiment of the present invention.

Please refer to FIG. 4 and FIG. 5. FIG. 4 is a schematic cross-sectional view of a 2D/3D image switching type liquid crystal display 100b in a two-dimensional image displaying status according to a second embodiment of the present invention. FIG. 5 is a schematic cross-sectional view of a 2D/3D image switching type liquid crystal display 100b in a three-dimensional image displaying status by adopting polarized glasses according to a second embodiment of the present invention. The 2D/3D image switching type liquid crystal display 100b includes a backlight module 102, a liquid crystal display (LCD) panel 104, a polarized plate 106, film-type patterned retarder (FPR) 108 and liquid crystal barrier layer 110. The difference between the 2D/3D image switching type liquid crystal displays 100a, 100b is the position of the liquid crystal barrier layer 110. In FIG. 4, the liquid crystal barrier layer 110 is disposed between the backlight module 102 and the LCD panel 104.

The backlight module 102 provides a backlight along a first direction "D1". The liquid crystal barrier layer 110 is disposed on one side of the backlight module 102 and includes a plurality of first grating regions 110a and a plurality of second grating regions 110b mutually interlaced with the first grating regions 110a. The LCD panel 104 is disposed on one side of the liquid crystal barrier layer 110, wherein the backlight sequentially passes through the liquid crystal barrier layer 110 and the LCD panel 104 to form a left-eye image L and a right-eye image R. The LCD panel 104 includes the color filter 116 disposed on the other side of the FPR 108. The color filter 116 includes a plurality of color regions (corresponding to the left-eye image L and the right-eye image R of pixel unit 120) and a plurality of black matrixes 118 along a second direction "D2" perpendicular to the first direction, the color regions 120 are mutually interlaced with the black matrixes 118.

The polarized plate 106 is disposed between the LCD panel 104 and the FPR 108 for receiving the left-eye image L and the right-eye image R to form a polarized light to pass through the FPR 108 for generating the left-hand circularly polarized light and the right-hand circularly polarized light.

The film-type patterned retarder (FPR) 108 is disposed on one side of the LCD panel 104 and includes a plurality of first phase difference regions 108a and a plurality of second phase difference regions 108b mutually interlaced with the first phase difference regions 108a along the second direction "D2" perpendicular to the first direction "D1". The left-eye image L and the right-eye image R correspondingly pass through the first phase difference regions 108a and the second phase difference regions 108b for forming a left-hand circularly polarized light and a right-hand circularly polarized light by the FPR 108.

In the liquid crystal barrier layer 110, each of the first grating regions 110a along the first direction "D1" correspondingly aligns to a boundary 108c between each of the first phase difference regions 108a and each of the second phase difference regions 108b. The first grating regions 110a and the second grating regions 110b correspond to the first phase difference regions 108a and the second phase difference regions 108b. The exertion of an electrical field is capable of controlling the first grating regions and the second grating regions of the liquid crystal barrier layer 110 to form a bright region and a dark region for adjusting the left-hand circularly polarized light and the right-hand circularly polarized light from the FPR 108 to switch the 2D/3D displaying status. In other words, a left eye and a right eye of a viewer can simultaneously observe one of the left-eye image L and the right-eye image R to form a two-dimensional image. Alternatively, the left eye and the right eye can correspondingly observe the left-eye image L and the right-eye image R respectively via the bright region to form a three-dimensional image by switching the liquid crystal barrier layer. In one case, the first grating regions 110a and the second grating regions 110b are mutually interlaced along a second direction "D2" perpendicular to the first direction "D1".

In one case of FIG. 4, when the electrical field is not applied to the liquid crystal barrier layer 110, the liquid crystal barrier layer 110 is in a normally white mode and the FPR 108 cannot affect the displaying status of the left-eye image L and the right-eye image R. Meanwhile, the first grating regions 110a and the second grating regions 110b are bright regions so that the left eye "LE" and the right eye "RE" of the viewer can simultaneously observe the left-eye image L and the right-eye image R to form the two-dimensional image.

In one case of FIG. 5, while performing a polarized three-dimensional image (i.e. adopting polarize glasses 122), the electrical field is applied to the liquid crystal barrier layer 110, the first grating regions 110a are dark regions and the second grating regions 110b are bright regions to allow the second grating regions 110b to adjust the left-hand circularly polarized light and the right-hand circularly polarized light so that the left eye and the right eye can correspondingly observe the left-eye image and the right-eye image respectively by a polarized glasses 122 to form a three-dimensional image by switching the liquid crystal barrier layer 110.

In one case of FIG. 5, while performing a three-dimensional image without glasses and when the electrical field is applied to the liquid crystal barrier layer 110, the first grating regions 110a are dark regions and the second grating regions 110b are bright regions to allow the second grating regions 110b to adjust the left-hand circularly polarized light and the right-hand circularly polarized light so that the left eye "LE" and the right eye "RE" can correspondingly observe the left-eye image L and the right-eye image R respectively without glasses to form a three-dimensional image by switching the liquid crystal barrier layer 110.

According to above-mentioned descriptions, the 2D/3D image switching type liquid crystal display can increase the vertical viewing angle of the LCD to implement the switching displays of two-dimensional image, three-dimensional image for a polarized glasses and three-dimensional image without glasses. When either the FPR is disposed between the LCD panel and the liquid crystal barrier layer or liquid crystal barrier layer is disposed between the LCD panel and the backlight module, an electrical field controls the first grating regions and the second grating regions to form a bright region and a dark region for adjusting the left-hand circularly polarized light and the right-hand circularly polarized light from the FPR to switch 2D/3D image by switching the liquid crystal barrier layer.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A two-dimensional and three-dimensional (2D/3D) image switching type liquid crystal display, comprising:
   a liquid crystal display (LCD) panel, for being passed by a light beam along a first direction to form a left-eye image and a right-eye image;
   a film-type patterned retarder (FPR) disposed on one side of the LCD panel and comprising a plurality of first phase difference regions and a plurality of second phase difference regions mutually interlaced with the first phase difference regions, wherein the left-eye image and the right-eye image correspondingly pass through the first phase difference regions and the second phase difference regions for forming a left-hand circularly polarized light and a right-hand circularly polarized light by the FPR; and
   a liquid crystal barrier layer comprising a plurality of first grating regions and a plurality of second grating regions mutually interlaced with the first grating regions, the FPR being disposed between the liquid crystal barrier layer and the LCD panel, and the first grating regions and the second grating regions corresponding to the first phase difference regions and the second phase difference regions, wherein an electrical field controls the first grating regions and the second grating regions to form a bright region and a dark region for adjusting the left-hand circularly polarized light and the right-hand circularly polarized light from the FPR so that either a left eye and a right eye of a viewer can simultaneously observe one of the left-eye image and the right-eye image to form a two-dimensional image or the left eye and the right eye can correspondingly observe the left-eye image and the right-eye image respectively via the bright region to form a three-dimensional image by switching the liquid crystal barrier layer.

2. The 2D/3D image switching type liquid crystal display of claim 1, wherein when the electrical field is not applied to the liquid crystal barrier layer, the first grating regions and the second grating regions are bright regions so that the left eye and the right eye of the viewer can simultaneously observe one of the left-eye image and the right-eye image to form the two-dimensional image.

3. The 2D/3D image switching type liquid crystal display of claim 2, wherein when the electrical field is applied to the liquid crystal barrier layer, the first grating regions are dark regions and the second grating regions are bright regions to allow the second grating regions to adjust the left-hand circularly polarized light and the right-hand circularly polarized light so that the left eye and the right eye can correspondingly observe the left-eye image and the right-eye image respectively by a polarized glasses to form a three-dimensional image by switching the liquid crystal barrier layer.

4. The 2D/3D image switching type liquid crystal display of claim 3, wherein the LCD panel further comprises a color filter disposed on one side of the FPR and opposite to the liquid crystal barrier layer, the color filter comprises a plurality of color regions and a plurality of black matrixes along a second direction perpendicular to the first direction, the color regions are mutually interlaced with the black matrixes, and the widths of the first grating regions are greater than these of the black matrixes respectively along the second direction.

5. The 2D/3D image switching type liquid crystal display of claim 3, wherein when the electrical field is applied to the liquid crystal barrier layer, the first grating regions are dark regions and the second grating regions are bright regions to allow the second grating regions to adjust the left-hand circularly polarized light and the right-hand circularly polarized light so that the left eye and the right eye can correspondingly observe the left-eye image and the right-eye image respectively without glasses to form a three-dimensional image by switching the liquid crystal barrier layer.

6. The 2D/3D image switching type liquid crystal display of claim 1, wherein the first grating regions and the second grating regions are mutually interlaced along a second direction perpendicular to the first direction.

7. The 2D/3D image switching type liquid crystal display of claim 1, further comprising a polarized plate disposed between the LCD panel and the FPR for receiving the left-eye image and the right-eye image to form a polarized light to pass through the FPR for generating the left-hand circularly polarized light and the right-hand circularly polarized light.

8. The 2D/3D image switching type liquid crystal display of claim 1, wherein each of the first grating regions along the first direction correspondingly aligns to a boundary between each of the first phase difference regions and each of the second phase difference regions, and each of the second grating regions along the first direction correspondingly aligns to each of the first phase difference regions and each of the second phase difference regions.

9. The 2D/3D image switching type liquid crystal display of claim 1, wherein each of the first phase difference regions and each of the second phase difference regions comprises a $\lambda/4$ retarder region and a $-\lambda/4$ retarder region.

10. A two-dimensional and three-dimensional (2D/3D) image switching type liquid crystal display, comprising:
a backlight module, providing a backlight along a first direction;
a liquid crystal barrier layer disposed on one side of the backlight module and comprising a plurality of first grating regions and a plurality of second grating regions mutually interlaced with the first grating regions;
a liquid crystal display (LCD) panel disposed on one side of the liquid crystal barrier layer, wherein the liquid crystal barrier layer is disposed between the backlight module and the LCD panel and the backlight sequentially passes through the liquid crystal barrier layer and the LCD panel to form a left-eye image and a right-eye image; and
a film-type patterned retarder (FPR) disposed on one side of the LCD panel and comprising a plurality of first phase difference regions and a plurality of second phase difference regions mutually interlaced with the first phase difference regions, wherein the first phase difference regions and the second phase difference regions correspond to the first grating regions and the second grating regions, and the left-eye image and the right-eye image correspondingly pass through the first phase difference regions and the second phase difference regions for forming a left-hand circularly polarized light and a right-hand circularly polarized light by the film-type patterned retarder;
wherein an electrical field controls the first grating regions and the second grating regions to form a bright region and a dark region for adjusting the left-hand circularly polarized light and the right-hand circularly polarized light from the FPR so that either a left eye and a right eye of a viewer can simultaneously observe one of the left-eye image and the right-eye image to form a two-dimensional image or the left eye and the right eye can correspondingly observe the left-eye image and the right-eye image respectively via the bright region to form a three-dimensional image by switching the liquid crystal barrier layer.

11. The 2D/3D image switching type liquid crystal display of claim 10, wherein when the electrical field is not applied to the liquid crystal barrier layer, the first grating regions and the second grating regions are bright regions so that the left eye and the right eye of the viewer can simultaneously observe one of the left-eye image and the right-eye image to form the two-dimensional image.

12. The 2D/3D image switching type liquid crystal display of claim 11, wherein when the electrical field is applied to the liquid crystal barrier layer, the first grating regions are dark regions and the second grating regions are bright regions to allow the second grating regions to adjust the left-hand circularly polarized light and the right-hand circularly polarized light so that the left eye and the right eye can correspondingly observe the left-eye image and the right-eye image respectively by a polarized glasses to form a three-dimensional image by switching the liquid crystal barrier layer.

13. The 2D/3D image switching type liquid crystal display of claim 11, wherein the LCD panel further comprises a color filter disposed on one side of the FPR and opposite to the liquid crystal barrier layer, the color filter comprises a plurality of color regions and a plurality of black matrixes along a second direction perpendicular to the first direction, the color regions are mutually interlaced with the black matrixes, and the widths of the first grating regions are greater than these of the black matrixes respectively along the second direction.

14. The 2D/3D image switching type liquid crystal display of claim 11, wherein when the electrical field is applied to the liquid crystal barrier layer, the first grating regions are dark regions and the second grating regions are bright regions to allow the second grating regions to adjust the left-hand circularly polarized light and the right-hand circularly polarized light so that the left eye and the right eye can correspondingly observe the left-eye image and the right-eye image respectively without glasses to form a three-dimensional image by switching the liquid crystal barrier layer.

15. The 2D/3D image switching type liquid crystal display of claim 10, wherein the first grating regions and the second grating regions are mutually interlaced along a second direction perpendicular to the first direction.

16. The 2D/3D image switching type liquid crystal display of claim 10, further comprising a polarized plate disposed between the LCD panel and the FPR for receiving the left-eye image and the right-eye image to form a polarized light to pass through the FPR for generating the left-hand circularly polarized light and the right-hand circularly polarized light.

17. The 2D/3D image switching type liquid crystal display of claim 10, wherein each of the first grating regions along the first direction correspondingly aligns to a boundary between each of the first phase difference regions and each of the second phase difference regions, and each of the first grating regions along the first direction correspondingly aligns to each of the first phase difference regions and each of the second phase difference regions.

18. The 2D/3D image switching type liquid crystal display of claim 10, wherein each of the first phase difference regions and each of the second phase difference regions comprises a $\lambda/4$ retarder region and a $-\lambda/4$ retarder region respectively.

* * * * *